UNITED STATES PATENT OFFICE.

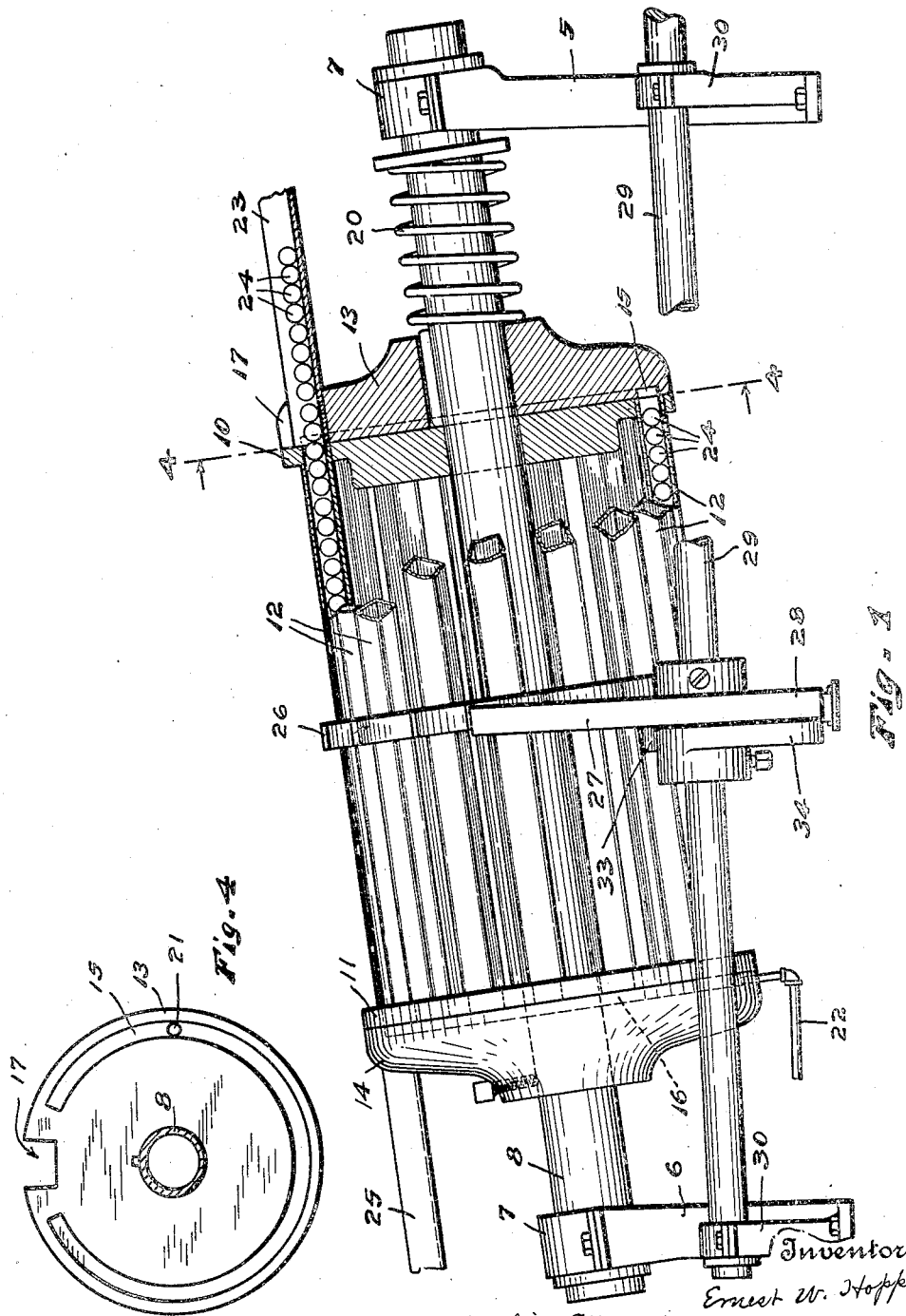

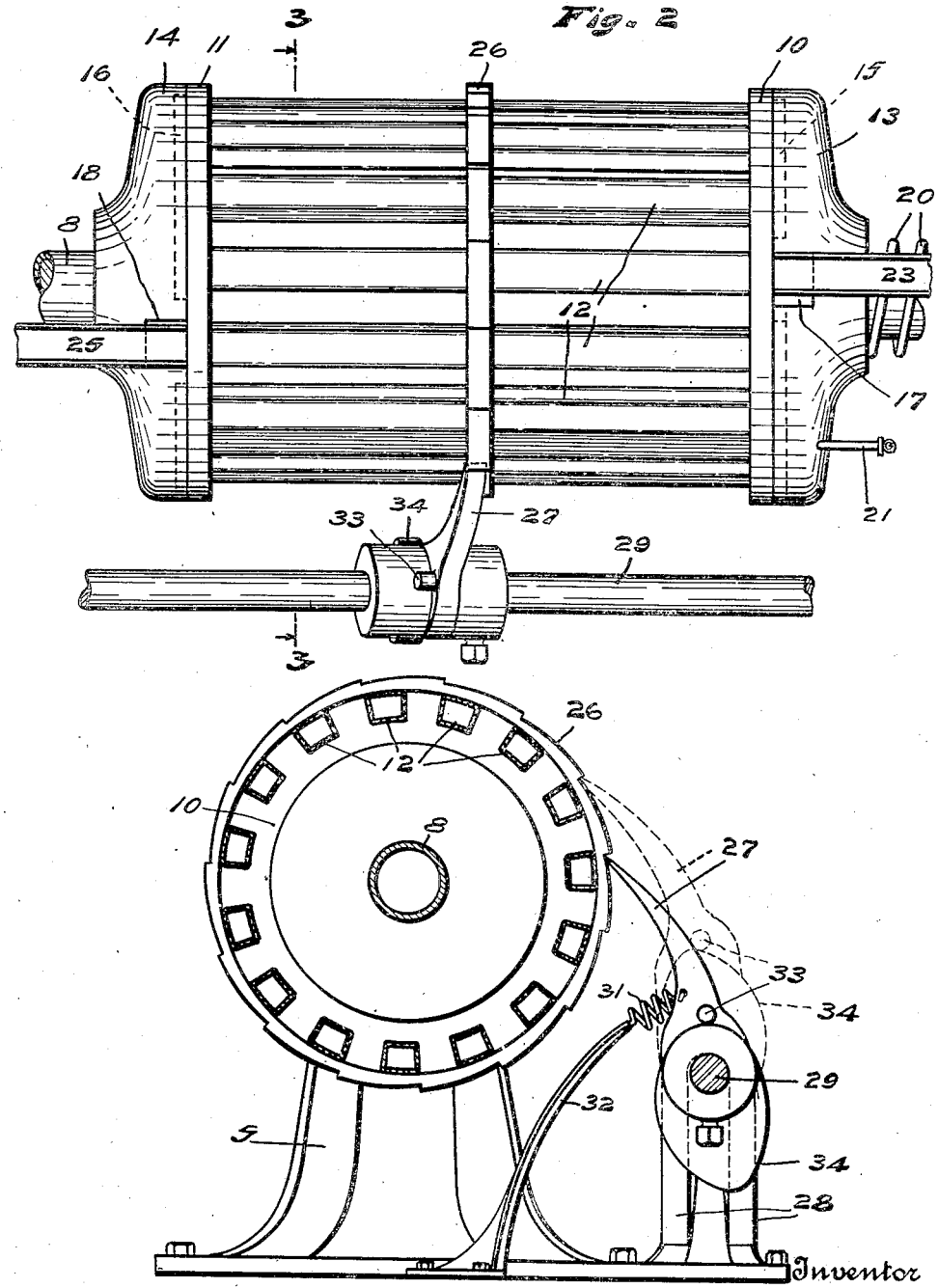

ERNEST W. HOPPER, OF SEATTLE, WASHINGTON.

RETORT.

1,331,066.  Specification of Letters Patent.  Patented Feb. 17, 1920.

Application filed September 8, 1919. Serial No. 322,582.

*To all whom it may concern:*

Be it known that I, ERNEST W. HOPPER, a citizen of the United States, residing at Seattle, in the county of King and State of Washington, have invented a certain new and useful Improvement in Retorts, of which the following is a specification.

My invention relates to improvements in retorts in which canned foods are adapted to be cooked by the use of steam and the object of my invention is to provide a retort in which the cooking process will be continuous, the cans of food entering at one end of the retort and after the food is cooked being discharged at the other end of the retort.

A further object is to provide a retort in which the device wherein the canned food is cooked may be rotated by intermittent movements so that each can will be turned completely over during the process of cooking.

A still further object is to provide a retort having cooking receptacles of novel and efficient construction and having novel and efficient means whereby the steam is introduced into said cooking receptacles.

A still further object is to provide a retort that is compact in its form of construction and that has a relatively large capacity in proportion to its size.

The invention consists in the novel construction, adaptation and combination of parts of a retort for steam cooking canned foods as will be more clearly hereinafter described and claimed.

I accomplish these objects by devices illustrated in the accompanying drawings, wherein—

Figure 1 is a view partly in side elevation and partly in cross-section of a retort constructed in accordance with my invention;

Fig. 2 is a plan view of the same parts thereof being broken away;

Fig. 3 is a view in cross-section on broken line 3, 3 of Fig. 2; and

Fig. 4 is a view partly in cross-section and partly in elevation on broken line 4, 4 of Fig. 1.

Referring to the drawings, throughout which like reference numerals indicate like parts, the numerals 5 and 6 designate two brackets that are provided on their upper portions with clips 7 which serve to rigidly clamp the two ends of a hollow shaft or support 8. The bracket 5 is preferably of greater height or is mounted on a higher base than the bracket 6 so that the shaft 8 is supported in an inclined position with respect to the horizontal.

Rotatably mounted on the shaft 8 are two spaced apart circular headers 10 and 11 that are connected with each other by a plurality of rectangularly shaped conduits 12 arranged in cylindrical formation as shown in Fig. 3 each of said conduits having an unobstructed passageway from the outer face of one header to the outer face of the opposite header so that cans may freely move therethrough, the several conduits and the two headers constituting a retort cage that is adapted to be rotated.

The outer faces of the two headers 10 and 11 are flat and smooth and are arranged to bear against the inner faces of two circular end plates 13 and 14, the surfaces of the end plates 13 and 14 being provided with arcuate grooves or channels 15 and 16, as shown in Fig. 4, that register with the openings at the ends of the conduits 12 but which terminate before they intersect the notches 17 and 18 in the upper peripheral portions of the end plates 13 and 14.

The end plate 14 is rigidly secured to the shaft 8 and the end plate 13 is splined on said shaft 8 and is urged toward the retort proper by a compression spring 20 that is interposed between it and the bracket 5 and that serves to hold the plates 13 and 14 in steam tight contact with the headers 10 and 11.

The arcuate channels 15 and 16 are connected with pipes 21 and 22 through which steam may be admitted to and drawn from said channels, the pipes 21 and 22 preferably being provided with valves, not shown, by which the inlet and outlet of steam may be controlled.

The notch 17 is connected with a feed chute 23 through which cans 24 are admitted and the notch 18 is connected with a discharge chute 25 through which cans are discharged. The chutes 23 and 25 are substantially parallel with the axis of the retort and the inclination of the retort is just sufficient to cause the cans to roll freely therein.

The notch 18 is arranged so that when one of the can conduits 12 register therewith the cans in such conduit will be discharged through the chute 25 and the notch 17 is arranged in slightly offset position with respect to the notch 17 so that the next forward movement of the retort from the discharge position will bring the conduit that was just emptied into alinement with the can inlet chute 23 and permit it to fill with cans that are to be subjected to the cooking process. After a conduit 12 has been filled with fresh cans the next rotary movement that is imparted to the retort will bring the freshly filled conduit into registration with the steam grooves 15 and 16 thereby causing such conduit to be filled with steam for the purpose of cooking the food contained in said cans. The cans will remain in the steam during the time that the retort is making substantially one complete revolution or until the conduit arrives again at the discharge position during which time the cans will have been turned completely over and subjected to the heat of the steam on all sides.

Any suitable mechanism may be provided for rotating the retort cage formed by the two headers 10 and 11 and the can conduits 12, as, for instance, the conduits 12 may be secured to an encircling ratchet ring 26 that is arranged to be engaged by a pawl 27 having a bifurcated lower end 28 that fits over a shaft 29 that is journaled in brackets 30.

The pawl 27 is held in engagement with the ring 26 by a tension spring 31 that is secured to a bracket 32 and such pawl is provided with a pin 33 that is arranged to be engaged by a cam 34 which is secured to the shaft 29 and is adapted to lift the pawl from the position shown by full lines to the position shown by broken lines each time the shaft is rotated to thereby impart a movement to the retort cage equal to the distance between two successive can chutes 12.

The shaft 30 will preferably be rotated by suitable power driven devices, not shown, which are timed so that the cans are left in the steam for a desired length of time during the movement of each conduit chute from the filling to the discharge position.

The conduits 12 will preferably be insulated on the outside with asbestos or other similar material to prevent excessive loss of heat by radiation.

In the operation of my retort steam may be admitted to the grooves 15 and 16 and cans containing food may be fed into the conduits 12 through the chute 23. As the retort cage rotates the conduits 12 will be successively filled with cans and moved into registration with the grooves 15 and 16. After the retort cage has been rotated through almost one complete revolution the conduit 12 that was first filled will arrive at the discharging position and will discharge its cans through the chute 25. The process is then continuous as long as cans are fed to the machine, one conduit discharging and the preceding conduit being filled each time the retort cage is advanced.

Obviously changes may be made in the form of construction and arrangement of parts of my invention without departing from the spirit thereof.

What I claim is:

1. A retort of the class described, comprising two headers mounted for rotation in spaced apart relation, a plurality of can conduits extending between said headers and arranged in cylindrical formation each of said can conduits having a passageway through both of said headers, and plates in contact with both of said headers, said plates having means for permitting the introduction of steam to said conduits and being provided with notches through which cans may enter and be discharged from said conduits.

2. A retort of the class described, comprising two spaced apart headers mounted for rotation, a plurality of can conduits extending between said headers and arranged in cylindrical formation, each of said can conduits having a passageway through both of said headers, a non-rotatably mounted plate in contact with the outer face of each of said headers, each of said plates having a notch in its upper portion affording access to said conduits and being provided with an arcuate groove that terminates before it intersects said notch and that registers with said conduits, and means for admitting steam to said arcuate grooves.

3. A retort of the class described, comprising two spaced apart headers mounted for rotation on an axis that is inclined slightly with respect to the horizontal, can conduits extending between said headers and arranged in cylindrical formation said can conduits having a passageway through both of said headers, means for rotating said conduits and headers by intermittent movements, a non-rotatably mounted end plate yieldingly held in contact with the outer face of each of said headers, each of said plates having a notch in the upper portion thereof affording access to said conduits, said notches being slightly offset with respect to each other and each of said plates having grooves that communicate with said conduits when said conduits are not in registration with either of said notches, and steam conduit means communicating with said grooves.

4. In a retort of the class described, the combination with two headers mounted for rotation in spaced apart relation, of a plurality of can conduits extending between said headers, and plates yieldingly engaging the outer faces of said headers, said plates having means for communicating steam to said headers.

In witness whereof, I hereunto subscribe my name this 26th day of August A. D. 1919.

ERNEST W. HOPPER.